No. 832,569. PATENTED OCT. 2, 1906.
J. A. CHAMBERS.
COMBINED TANK AND POT FURNACE.
APPLICATION FILED JAN. 4, 1906.

2 SHEETS—SHEET 1.

WITNESSES
INVENTOR

No. 832,569.
PATENTED OCT. 2, 1906.
J. A. CHAMBERS.
COMBINED TANK AND POT FURNACE.
APPLICATION FILED JAN. 4, 1906.

2 SHEETS—SHEET 2.

WITNESSES
INVENTOR

UNITED STATES PATENT OFFICE.

JAMES A. CHAMBERS, OF ALLEGHENY, PENNSYLVANIA, ASSIGNOR TO GEORGE T. OLIVER, OF ALLEGHENY COUNTY, PENNSYLVANIA.

COMBINED TANK AND POT FURNACE.

No. 832,569.　　　Specification of Letters Patent.　　　Patented Oct. 2, 1906.

Application filed January 4, 1906. Serial No. 294,586.

*To all whom it may concern:*

Be it known that I, JAMES A. CHAMBERS, of Allegheny, in the county of Allegheny and State of Pennsylvania, have invented a certain new and useful Improvement in a Combined Tank and Pot Furnace, of which the following is a full, clear, and exact description, reference being had to the accompanying drawings, forming part of this specification, in which—

Figure 1:
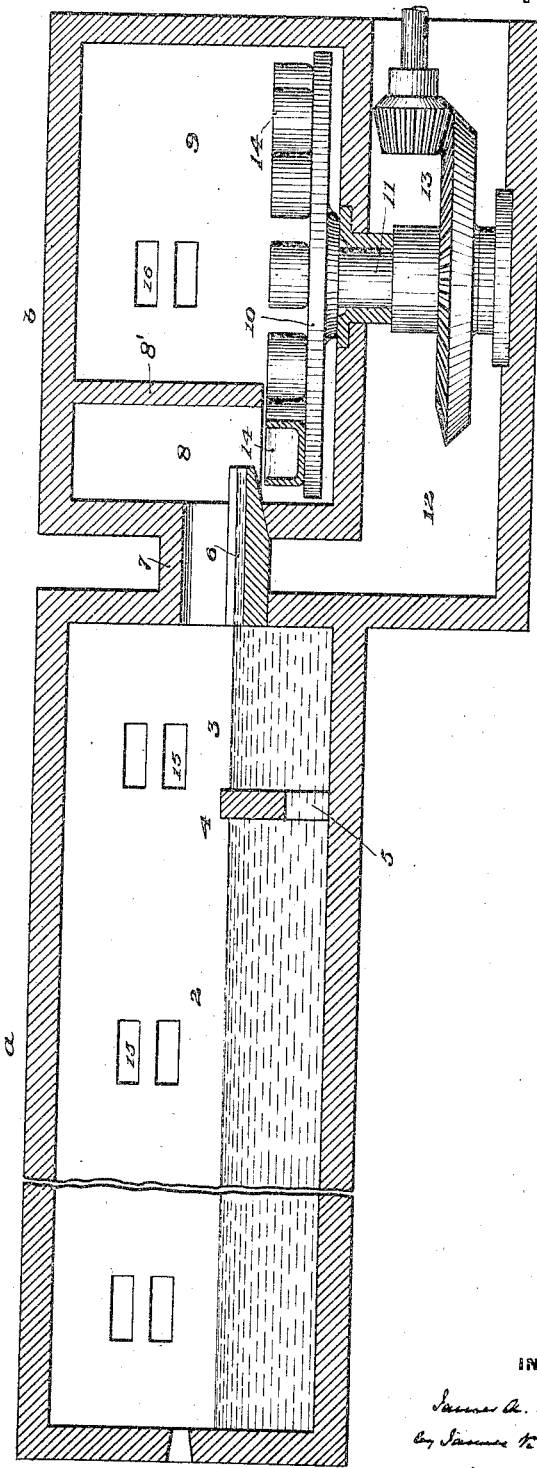
Figure 2:
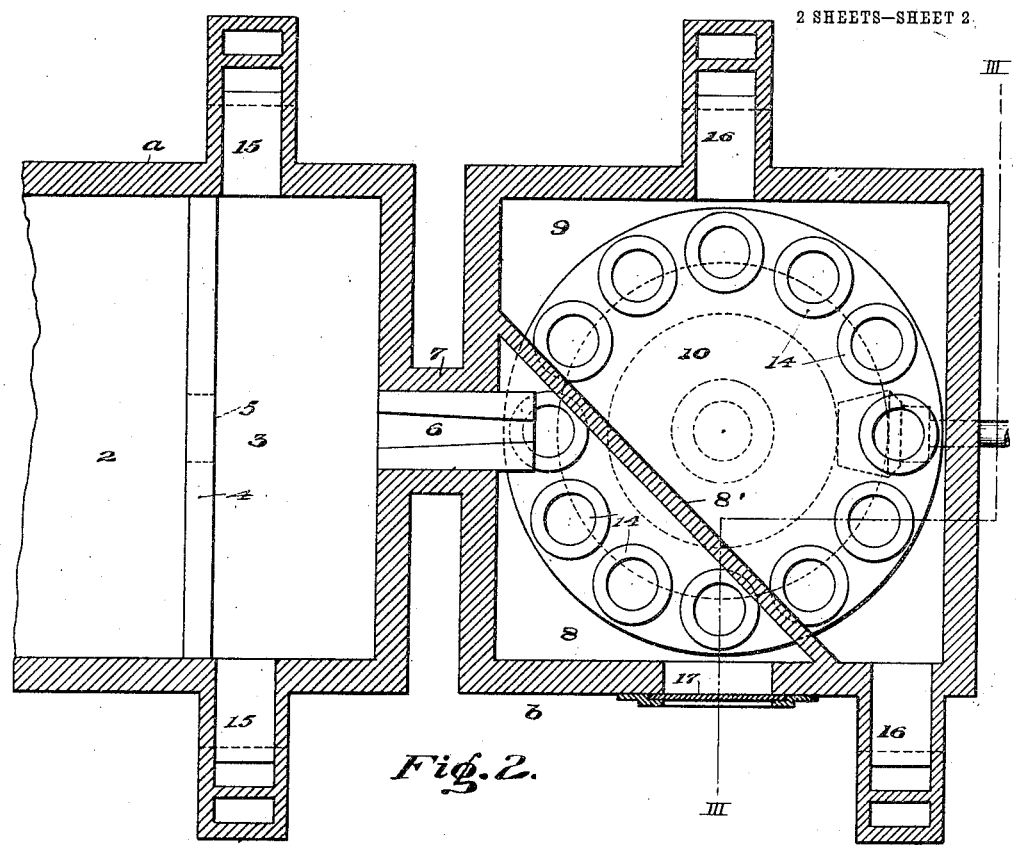
Figure 3:
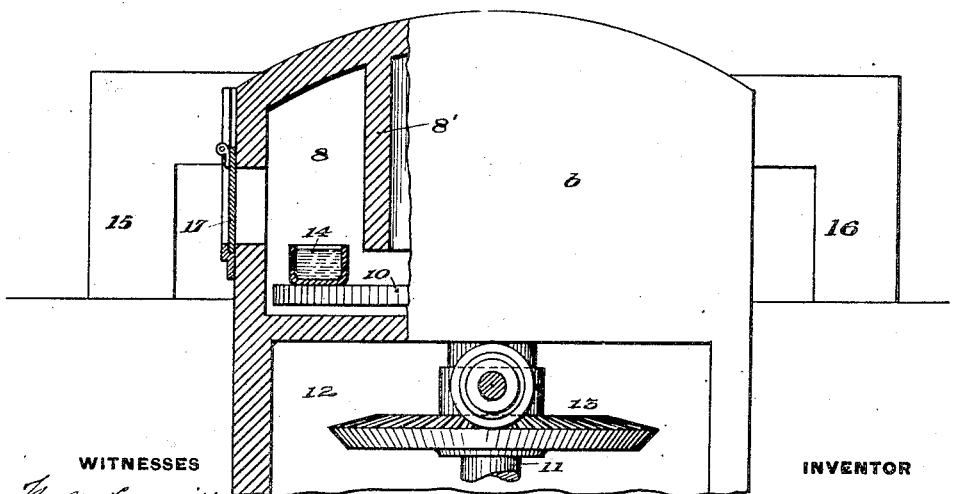

Figure 1 is a longitudinal vertical sectional view of a combined pot and tank furnace illustrating my invention. Fig. 2 is a horizontal sectional view of the same, and Fig. 3 is a vertical cross-sectional view.

Like symbols of reference indicate like parts wherever they occur.

Heretofore in the use of combined pot and tank furnaces, or furnaces in which the glass is delivered from a tank-furnace into receptacles from which the glass is poured, drawn, or gathered, difficulty has been experienced in obtaining glass of the proper quality and mixture from the pots or receptacles after they have been once emptied and refilled. The reason of this is that a certain amount of chilled glass adheres to the sides and bottom of the empty pots or receptacles, and this chilled and hardened glass, owing to its chilled and hardened condition, will not mix properly with the molten glass which is poured into or flows into the pot or receptacle during the refilling operation.

The object of my invention is to provide means for melting the chilled and hardened glass in the empty pots or receptacles before they pass to the refilling-station.

I will now describe my invention so that others skilled in the art to which it appertains may employ the same.

In the drawings, 2 represents the melting-chamber of a tank-furnace a, and 3 the fining-chamber, these chambers being separated from each other by the bridge-wall 4 and communicating through the opening or openings 5 at or near the bottom of the bridge-wall. At the opposite end of the fining-chamber 3 is a trough 6, which extends through a neck 7, that joins the fining-chamber with a pot-furnace b. This pot-furnace b is divided by a mantle 8' into two chambers—a pot-filling chamber 8, into which the neck 7 and trough 6 open, and a pot-heating chamber 9, in which the empty pots are heated for the purpose of melting the chilled and hardened glass that adheres to the sides and bottom. In the floor of the chambers 8 and 9 is a rotatory turn-table 10, mounted on a suitable shaft 11 in a pit 12 and provided with rotating mechanism 13. This table is designed and adapted to carry a series of pots or receptacles 14, which may be of any form and size, placed at suitable intervals on the table. Heating-flues 15 may be arranged at suitable intervals in the walls of the melting and fining chambers 2 and 3, and a set of flues 16 is arranged in the walls of the pot-heating chamber 9, by means of which the temperature in the heating-chamber may be maintained at a degree sufficiently high to rapidly melt the hardened glass in the empty pots. As already stated, the chambers 8 and 9 are separated from each other by a mantle 8', which extends from the roof of the chambers down to a point close to the surface of the table, leaving only sufficient room for the rotation of the table 10 and the pots carried thereon. In the wall of the pot-chamber 8 is a door 17, by means of which the pots containing molten glass are removed from the pot-chamber and empty pots are introduced.

The operation is as follows: The batch is fed in at the end of the tank-furnace and melted in the usual manner, the molten glass passing into the fining-chamber 3. From the fining-chamber the glass flows through the trough 6 to the pots 14, which as they are filled pass by the rotation of the table to the door 17, through which they are removed one by one and empty pots are put in their place. These empty pots by the rotation of the table 10 pass to the heating-chamber 9, where they are subjected to a heat of such intensity as to rapidly melt the chilled glass adhering thereto. These pots after being subjected to this heat pass from the heating-chamber with the adhering glass now in a molten condition, into the pot-chamber and under the trough 6, where they are refilled with molten glass.

Although I have described my invention as applied to particular forms of pot and tank furnaces, I do not desire to limit myself thereto; nor do I desire to limit myself to any particular arrangement of the heating-chamber in connection with the pot-furnace, as other modifications of my invention will from the foregoing description suggest themselves to those skilled in the art.

The advantages of my invention result from the combined action of the pot and heating furnaces with their appliances whereby the pots are presented in proper condition for refilling.

What I claim, and desire to secure by Letters Patent, is—

1. The combination of a tank-furnace having a passage for conducting molten glass to the pot-furnace, a pot-furnace having a pot-filling chamber and a pot-heating chamber, and a device for carrying the pots in the pot-furnace from one chamber to the other; substantially as specified.

2. The combination of a tank-furnace having a passage for conducting molten glass to the pot-furnace, a pot-furnace having a pot-filling chamber and a pot-heating chamber, a mantle situate between the pot-filling chamber and the pot-heating chamber, and a turn-table adapted to carry the pots to the pot-heating chamber and from the pot-heating chamber to the pot-filling chamber; substantially as specified.

In testimony whereof I have hereunto set my hand.

JAMES A. CHAMBERS.

Witnesses:
JAMES K. BAKEWELL,
CARRIE E. EGGERS.